May 23, 1972  A. L. LA NEVE  3,664,643
BEVERAGE MIXER AND DISPENSER
Filed May 11, 1970  3 Sheets-Sheet 1

INVENTOR
ANGELO L. LA NEVE

BY

May 23, 1972  A. L. LA NEVE  3,664,643
BEVERAGE MIXER AND DISPENSER
Filed May 11, 1970  3 Sheets-Sheet 2
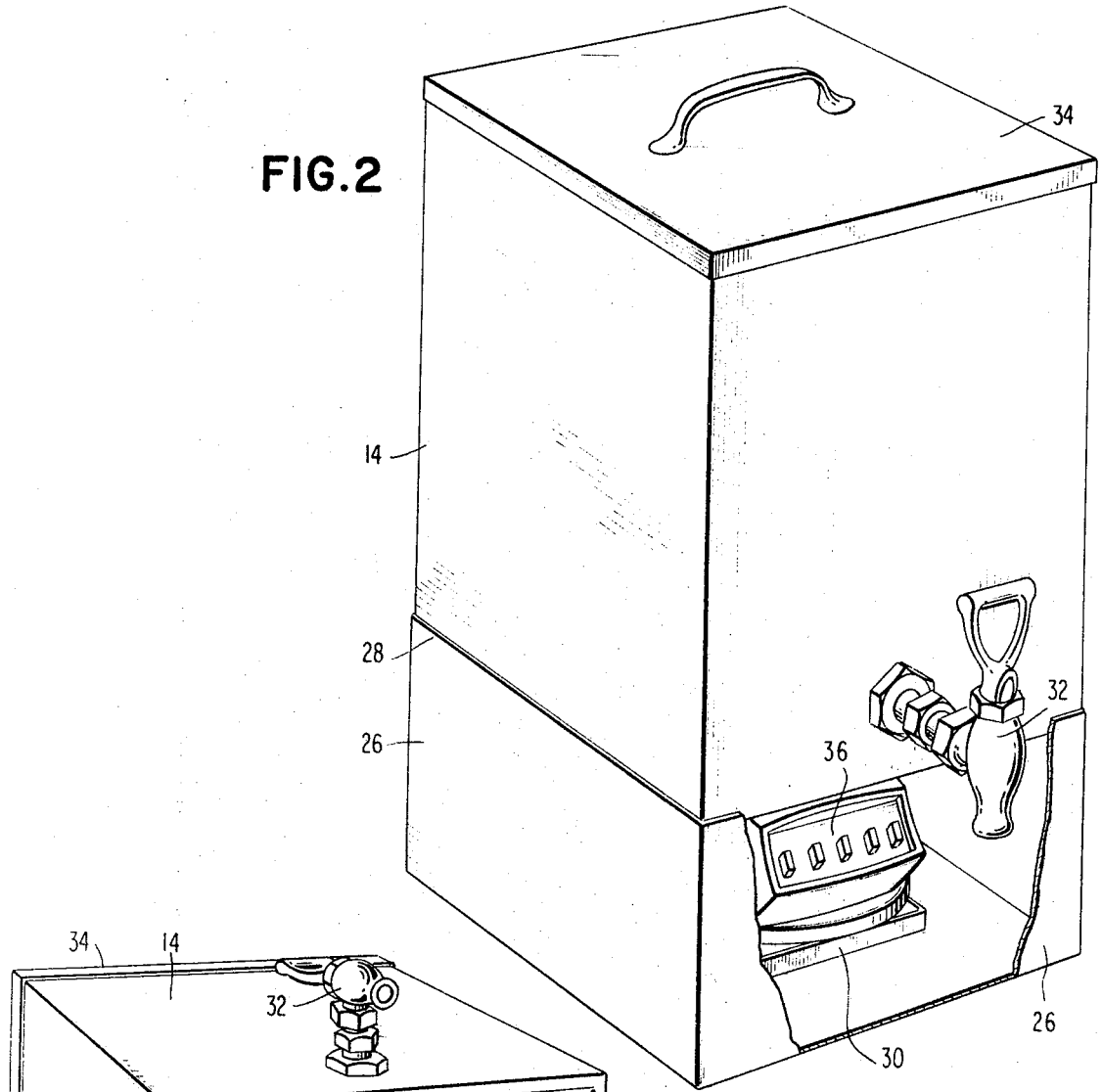
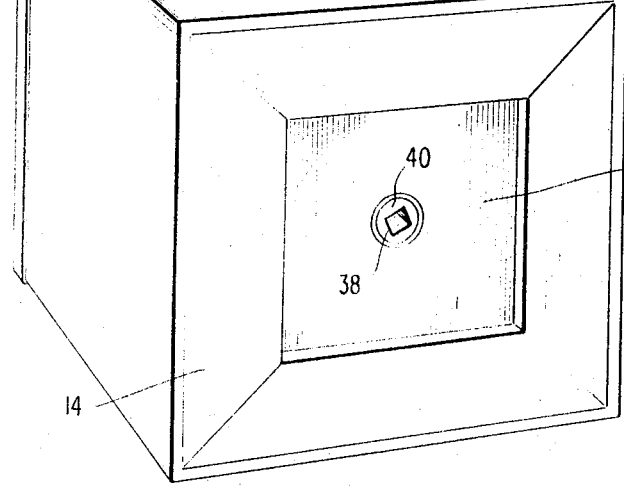
INVENTOR
ANGELO L. LA NEVE
BY
ATTORNEYS May 23, 1972  A. L. LA NEVE  3,664,643
BEVERAGE MIXER AND DISPENSER
Filed May 11, 1970  3 Sheets-Sheet 3

INVENTOR
ANGELO L. LA NEVE
BY
ATTORNEYS

United States Patent Office 3,664,643
Patented May 23, 1972

3,664,643
BEVERAGE MIXER AND DISPENSER
Angelo L. La Neve, West Paterson, N.J., assignor to
ALN Enterprises
Filed May 11, 1970, Ser. No. 36,268
Int. Cl. B01f 7/16; B67d 1/00
U.S. Cl. 259—44
12 Claims

ABSTRACT OF THE DISCLOSURE

An improved beverage dispenser comprising a non-circularly cross-sectioned, upright mixing chamber having a closed bottom and an open top; an agitating means within said mixing chamber adapted to be actuated through the mixing chamber bottom by a rotatable shaft; an insulated cooling chamber surrounding the mixing chamber in at least its vertical extension; a base beneath and upon which the mixing and cooling chamber rests and adapted to support an electric motor with a rotatable shaft whereby the agitating means in said mixing chamber is actuated; a removable, leakproof top covering the open top of the mixing chamber; and a beverage withdrawal spigot communciating with the mixing chamber. The dispenser is useful in dispensing mixed drinks requiring substantial mixing prior to consumption.

---

This invention concerns an improved refrigerating and mixing beverage dispenser. More particularly, the beverage dispenser of this invention comprises a non-circular mixing chamber containing an agitating means and surrounded by an insulated cooling chamber, all adapted to be fitted above an electric motor, preferably above a commercial blender base. The beverage dispenser of this invention is particularly useful for preparing and serving premixed quantities of mixed alcoholic beverages such as whiskey sours, daiquiris and other such beverages requiring substantial mixing and foaming prior to consumption.

The beverage dispensers described in United States Patent 2,088,376 issued on July 27, 1937 to L. C. Kaskey and in United States Patent 2,289,645 issued on July 14, 1942 to E. C. W. Geistert appear representative of the prior art dispensers. Neither of these patents is concerned with dispensing mixed alcoholic beverages requiring substantial mixing and foaming action prior to consumption or with the problems attendant dispensing such beverages in premixed quantities. It is also apparent that the structural arrangements of the beverage dispensers therein are substantially different from that of the beverage dispenser of this invention.

Numerous advantages are attendant the construction of the beverage dispenser of this invention. The beverage dispenser of this invention provides easy removal from the electric motor used to actuate the agitating means in the mixing chamber, and thereafter the beverage dispenser itself may be totally immersed in a suitable cleaning medium without damage thereto. Additionally, the beverage dispenser maintains the beverage, which may be corrosive or otherwise disadvantageous, completely out of contact with the electric motor during use. Moreover, the beverage dispenser of this invention need not be detached from the electric motor to refill the mixing chamber nor need the mixing itself stop while the beverage is being drawn from the mixing chamber. The mixing chamber of the dispenser is non-circularly cross-sectioned to avoid the creation of a vortex during the mixing and foaming operation. The non-circular shape of the mixing chamber also provides improved foaming action during mixing or agitating to maintain a foamed "head" on the beverage during consumption. Also, the beverage dispenser of this invention is adapted for use with any commercially available blender base to provide the electric motor to actuate the agitating means in the mixing chamber. However, use of a conventional blender base to provide the electric motor is not required by this invention.

Generally, the overall beverage dispenser of this invention comprises a non-circularly cross-sectioned, upright mixing chamber having a closed bottom and an open top; an agitating means within the mixing chamber to provide mixing and foaming action during use adapted to be actuated through the mixing chamber bottom by a rotatable shaft; an insulated cooling chamber surrounding the mixing chamber in at least its vertical extension; a base beneath and upon which the mixing chamber rests adapted to support an electric motor with a rotatable shaft whereby the agitating means in said mixing chamber is actuated; a removable, leakproof top covering the open top of the mixing chamber; and a beverage withdrawal spigot communicating with the mixing chamber. The removable top can either be completely removable from the remainder of the dispenser or may only be hinged and thus only partially removable.

The following description of the figures of the drawings provides a more complete understanding of the various embodiments of the beverage dispenser of this invention.

For a more complete understanding of the various practical applications of my invention, reference is made to the appended drawings in which:

FIG. 2 is an additional frontal view with a conventional blender base positioned as the source of the electric motor;

FIG. 3 is a bottom view of the mixing and cooling chamber portion of the beverage dispenser of this invention depicting the fitting through which the agitator means is actuated;

Figures 1, 5:
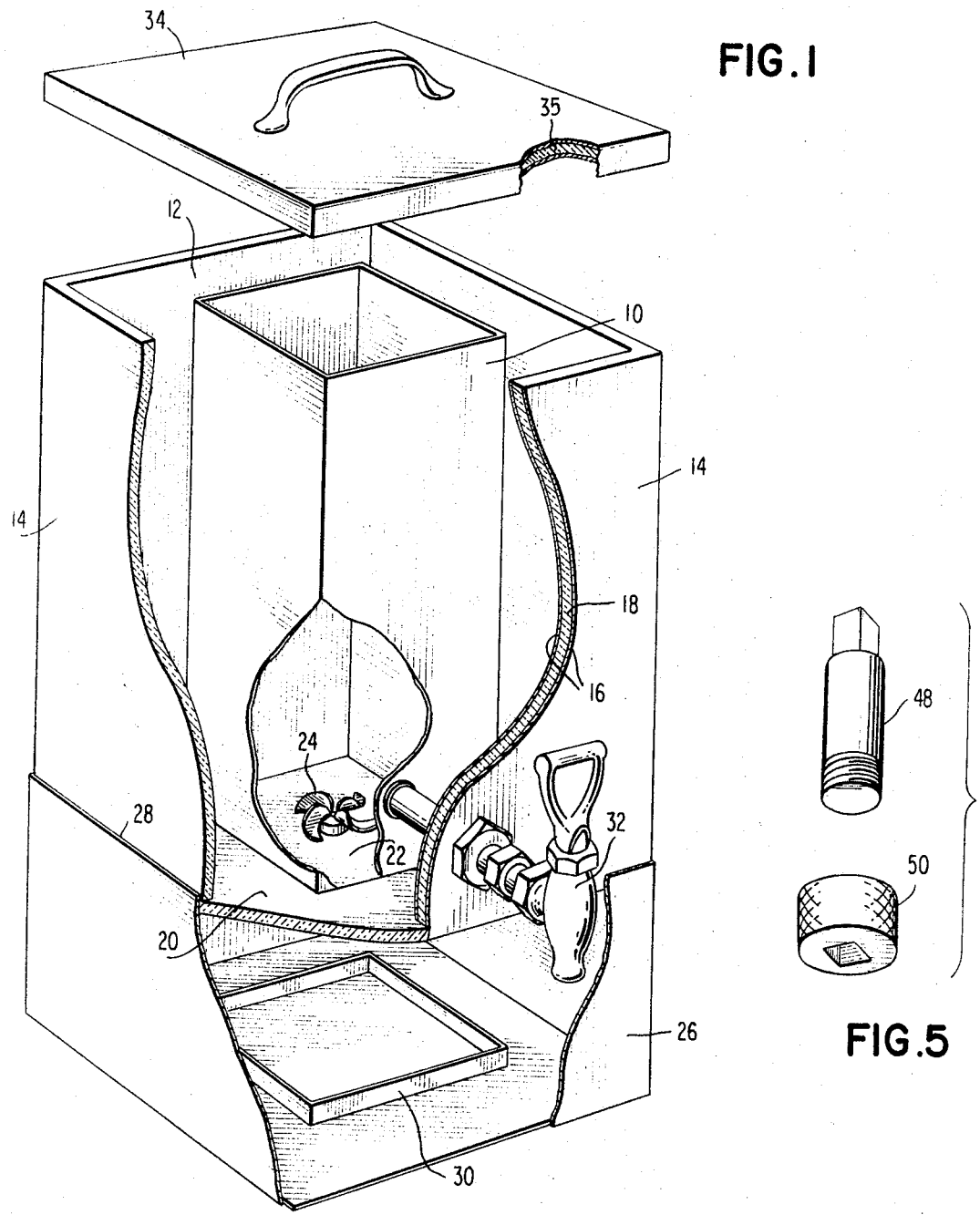
FIG. 1 is a frontal view of a beverage dispenser of this invention showing the internal arrangement of the mixing and cooling chamber and the agitator means.
FIG. 5 represents the adapter means useful to adapt any conventional blender base to the fitting through which the agitator means is actuated.

FIG. 1 represents an embodiment of the invention without the electric motor. This embodiment is adapted to allow use with a conventional blender bottom as the electric motor. The mixing chamber 10 of this embodiment has a square horizontal cross section and may be made of any suitable material such as metal or a suitable synthetic resin. Other vortex eliminating cross sections are acceptable such as rectangular or elliptical cross sections. The mixing chamber 10 is surrounded by a cooling chamber 12 bounded on its outside by a solid insulating material 14 and on its inner side by the outer wall of the mixing chamber 10. The cooling chamber is normally filled with ice or an ice and salt mixture to provide refrigeration. The insulation material 14 forming the outer boundary of the cooling chamber can be a synthetic resin having reduced heat conducting properties such as Bakelite or may be a double-layered arrangement of sheet metal 16, such as stainless steel, with conventional insulation material 18 such as fiber glass therebetween. In the embodiment of FIG. 1 the cooling chamber 12 surrounds the mixing chamber 10 only vertically. Therefore, a cooling chamber bottom 20 is present at the same level on which the bottom 22 of the mixing chamber is provided. The agitating means 24 is present within the mixing chamber. In this embodiment adapted for use with a conventional blender base, the agitating means 24 is similar or identical to those normally used with commercially available blenders. The base 26 adapted to support the electric motor is separable from the mixing and cooling chamber along line 28. The adapter lip 30 is part of base 26 and is designed to hold or retain the motor means and to prevent vibration. The spigot 32 is adapted to pass through the insulation material 14 and the cooling chamber 12 and into the mixing chamber 10 to permit withdrawal of the beverage therefrom. Top 34, preferably including insulation material 35, is adapted to fit tightly on both the mixing chamber 10 and the insulation material 14 bounding the cooling chamber.

FIG. 2 depicts the embodiment of FIG. 1 with a conventional blender base 36 surrounded and held in place by the adapter lip 30. Moreover, this figure shows top 34 in place. This figure also indicates the arrangement between the base 26 and the insulated outer surface 14 of cooling chamber 12. Surface 14 fits snugly inside of base 26 along line 28 and rests upon a lip (not shown) on the inside of base 26.

FIG. 3 is a bottom view of the beverage dispenser with the base 26 removed to indicate a manner of adapting the bottom 22 of the mixing chamber 10 for the passage of the rotatable shaft of the electric motor which shaft actuates the agitating means 24. The bottom 22 of the mixing chamber has a hole 38 therethrough in which is inserted a fitting 40 into which the rotatable shaft is inserted during use. This figure also shows an embodiment wherein the insulation material 14 partially covers the bottom of the mixing chamber 22 and the bottom of the cooling chamber 20.

Figures 4, 6:
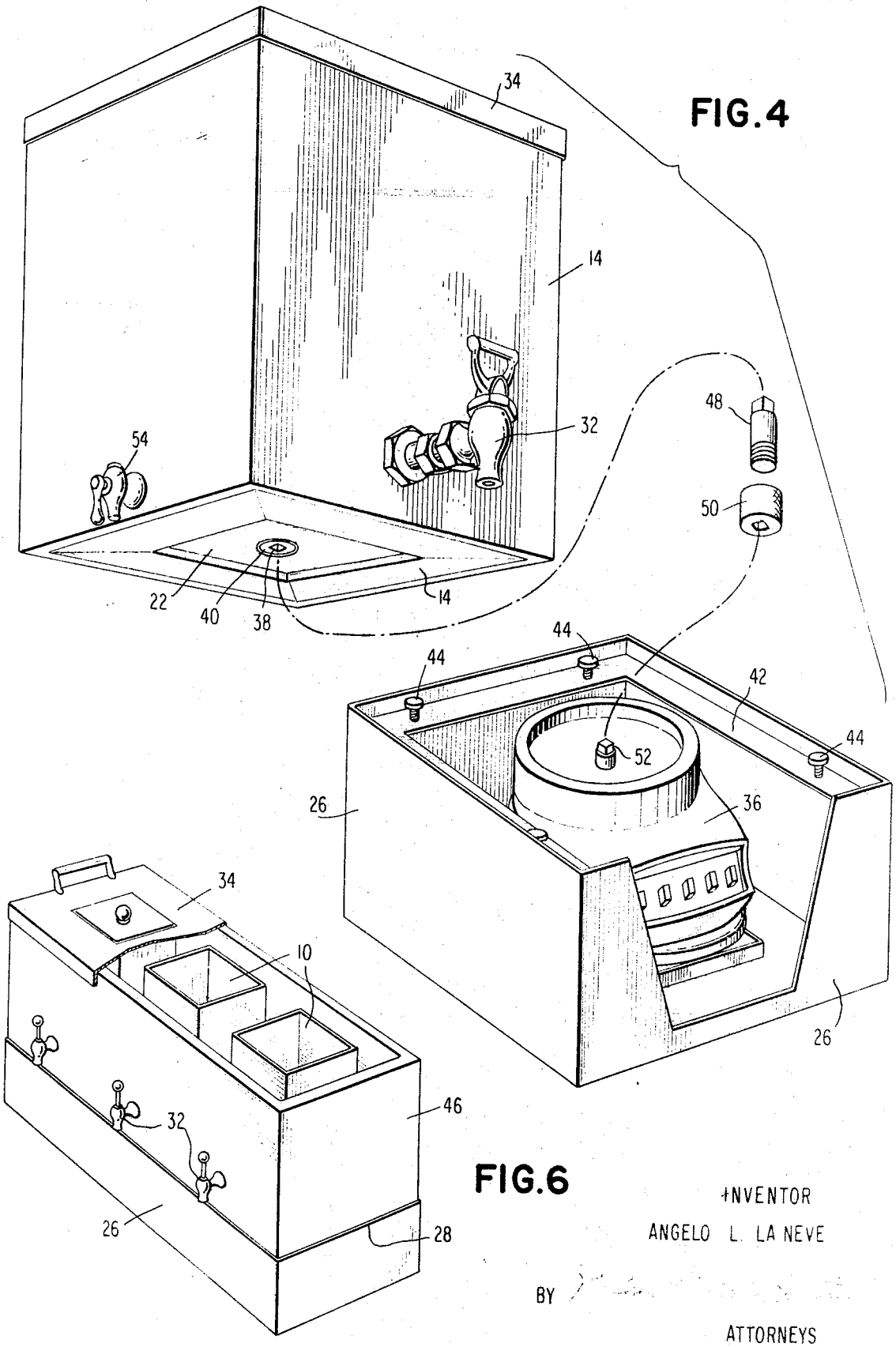
FIG. 4 is another frontal view depicting the mixing and cooling chamber portion and the base portion of the beverage dispenser of this invention separated. Additionally, shown is an adapter element useful in actuating the agitator means.
FIG. 6 is a beverage dispenser of this invention having a multiplicity of mixing chambers.

FIG. 4 shows the base 26 with blender bottom 36 therein and separated from the remainder of the beverage dispenser. This figure indicates more clearly how the cooling and mixing chamber portion 40 of the beverage dispenser fits into the base 26. The lip 42 on the inside of the base and adjustable legs 44 attached thereto are represented. The cooling and mixing chamber portion 40 rests upon the adjustable legs fitting snugly against the base 26.

FIG. 4 also more clearly represents an advantageous means for actuating the agitating means within the cooling chamber. The hole 38 through the bottom of the mixing chamber 22 is adapted in a leakproof manner with a standard fitting 40 into which a rotatable shaft fits. The adapter shaft 48 itself fits into fitting 40 and the adapter 50. The adapter 50 in turn fits onto the rotatable shaft 52 of the blender base. The use of a proper-sized adapter shaft 48 and adapter 50 allows the use of any conventional blender base with a rotatable shaft 52. Optionally, the fitting 40 can be chosen to fit a particular blender base with a particular size rotatable shaft 52 and thus eliminate the need for the use of adapter shaft 48 and adapter 50.

Note also that FIG. 4 represents the cooling and mixing chamber portion 12 as itself being adapted with a drain spigot 54 to remove water from the cooling chamber.

FIG. 5 represents the adapter means itself comprising the adapter shaft and adapter, 48 and 50, respectively.

FIG. 6 represents an embodiment wherein a multiplicity of mixing chambers 10 with single or plural cooling chambers 46 are arranged in tandem. This arrangement provides an apparatus useful when dispensing numerous, different types of mixed alcoholic beverages.

In the beverage dispenser of this invention the mixing chamber 10 can be of any acceptable and useful volume from for instance about one quart to two or three gallons or even more. The volume of the cooling chamber will depend upon the volume and shape of the mixing chamber, the type of materials used, particularly insulation, and other factors. Generally, the chamber should be only large enough to provide sufficient refrigeration for the particular cooling chamber.

The materials which may be used to construct the beverage dispenser of this invention may vary over a wide range. Various metals such as stainless steel are useful. Also, various synthetic resins such as polyolefins are useful. Combinations of such materials may also be useful.

The beverage dispenser of this invention is useful for serving beverages requiring substantial mixing and foaming prior to consumption. It is particularly adapted for such use due to the non-circular cross section of the mixing chamber. The mixing chamber eliminates the vortex effect which would be present if the mixing chamber were circular. This vortex effect could cause the liquid in the mixing chamber to circulate or swirl in the chamber as a mass; such circulation would not provide the requisite mixing and foaming action of the dispenser of this invention.

Additionally, the beverage dispenser of this invention is useful in serving premixed batches of beverages. Thus, for example, in serving alcoholic beverages, a batch or batches can be prepared beforehand and then merely transferred to the refrigerated mixing chamber of the beverage dispenser as needed prior to serving. It is also possible with the beverage dispenser of this invention to both agitate and withdraw the liquid simultaneously. As a result substantial individual preparation time is eliminated and more customers may be served during hours of peak activity.

Although the present invention has been described with reference to preferred embodiments, numerous modifications and rearrangements could be made and still the resulting apparatus would come within the scope of the invention.

It is claimed:

1. A beverage dispenser comprising a noncircularly cross-sectioned, upright mixing chamber having a closed bottom and an open top; an insulated cooling chamber surrounding the mixing chamber in at least its vertical extension and having an open top; agitating means within the mixing chamber and including a rotatable fitting through the bottom of both the mixing chamber and the cooling chamber to permit actuation of the agitating means; a base beneath the mixing chamber and the cooling chamber and upon which the mixing chamber and the cooling chamber rest, the base including on its upper surface adjustable leg means for adjusting the level of the mixing chamber and the cooling chamber with respect to the base, the base adapted to support an electric motor with a rotatable shaft contacting the agitating means rotatable fitting whereby the agitating means is actuated; a single removable, leakproof top covering both the open top of the mixing chamber and the open top of the cooling chamber; and a beverage withdrawal spigot communicating with the mixing chamber and permitting withdrawal of beverage from the mixing chamber.

2. A beverage dispenser of claim 1 further containing an electric motor having a rotatable shaft and held firmly in place beneath the mixing chamber with the rotatable shaft in contact with the agitating means rotatable fitting, so that upon rotation of the rotatable shaft the agitating means in the mixing chamber is actuated.

3. A beverage dispenser of claim 2 further containing an adapter means on the rotatable shaft of the electric motor by which the agitator means rotatable fitting is actuated through the mixing chamber bottom.

4. A beverage dispenser of claim 2 wherein the electric motor is provided by a conventional blender base.

5. A beverage dispenser of claim 4 further containing an adapter means on the rotatable shaft of the conventional blender base by which the agitator means is actuated through the mixing chamber bottom.

6. A beverage dispenser of claim 1 wherein the mixing chamber has a square horizontal cross section.

7. A beverage dispenser of claim 1 wherein the top is insulated.

8. A beverage dispenser of claim 1 wherein the insulated cooling chamber has a partially insulated bottom.

9. A beverage dispenser comprising a plurality of beverage dispensers as claimed in claim 1 having a common base.

10. A beverage dispenser of claim 9 wherein the mixing chambers of said plurality of beverage dispensers are surrounded by a common insulated cooling chamber.

11. A beverage dispenser of claim 1 further containing a drain means for the insulated cooling chamber.

12. A beverage dispenser comprising a mixing chamber having a closed bottom and an open top; an insulated cooling chamber surrounding said mixing chamber in at least its vertical extension and having an open top; agitating means within the mixing chamber and including a rotatable fitting through the bottom of both the mixing chamber and the cooling chamber to permit actuation of the agitating means; a base beneath the mixing chamber and the cooling chamber and upon which the mixing chamber and the cooling chamber rest, the base including on its upper surface adjustable leg means for adjusting the level of the mixing chamber and the cooling chamber with respect to the base, the base adapted to support an electric motor with a rotatable shaft contacting the agitating means rotatable fitting whereby the agitating means is actuated; a removable, leakproof top covering the open top of the mixing chamber; and a beverage withdrawal spigot communicating with the mixing chamber and permitting withdrawal of beverage from the mixing chamber.

References Cited

UNITED STATES PATENTS

| | | | |
|---|---|---|---|
| 1,769,890 | 7/1930 | Peters | 259—66 |
| 1,611,281 | 12/1926 | Ruggaber | 259—Dig 25 |
| 2,794,627 | 6/1957 | Rodwick | 259—Dig 26 |
| 2,088,376 | 7/1937 | Kaskey | 259—61 |
| 2,289,645 | 7/1942 | Geistert | 259—108 X |

FOREIGN PATENTS

| | | | |
|---|---|---|---|
| 581,807 | 10/1924 | France | 259—Dig 27 |
| 29,437 | 8/1906 | Austria | 62—390 |

WALTER A. SCHEEL, Primary Examiner

P. R. COE, Assistant Examiner

U.S. Cl. X.R.

62—392, 400; 259—67, Dig 25, Dig 27